Sept. 19, 1961 L. J. JOHNSON 3,001,124
APPARATUS FOR PRODUCING ALTERNATING CURRENT
Filed Jan. 5, 1959 3 Sheets-Sheet 1

INVENTOR.
LEOPOLD J. JOHNSON
BY
Christie, Parker & Hale
ATTORNEYS.

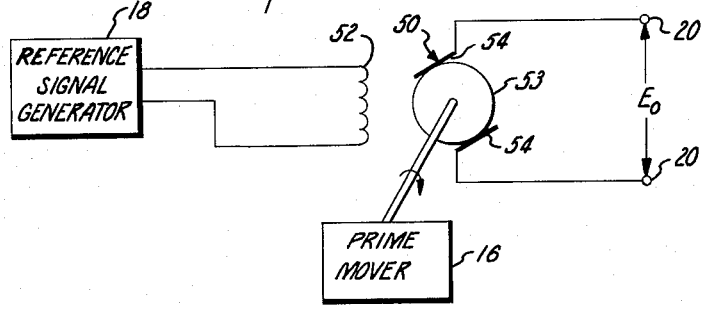
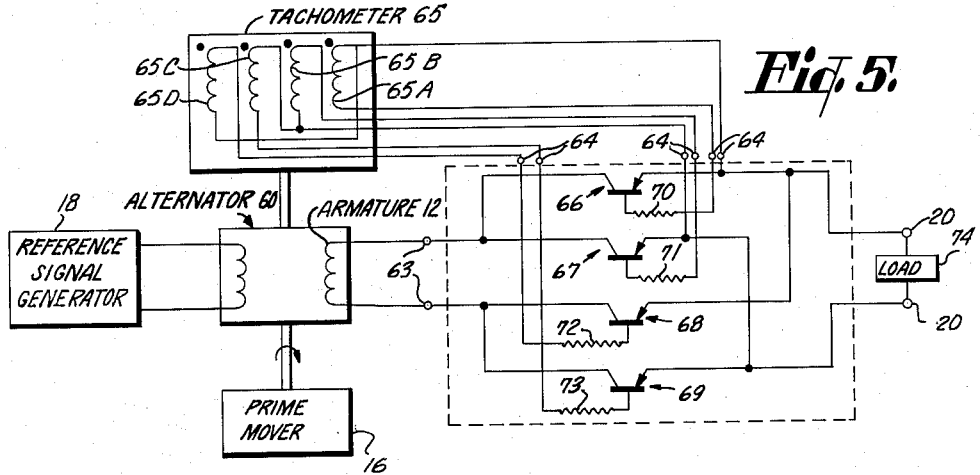
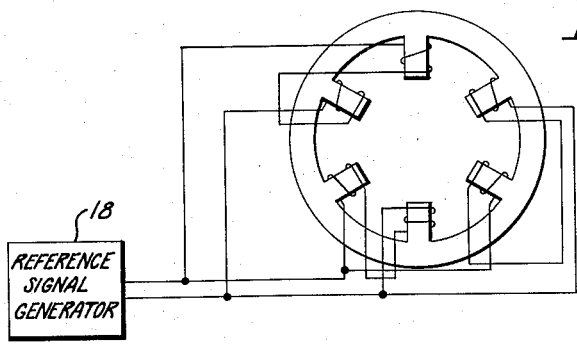
INVENTOR.
LEOPOLD J. JOHNSON
BY
ATTORNEYS

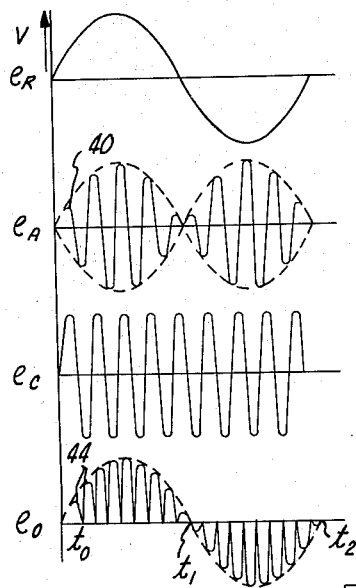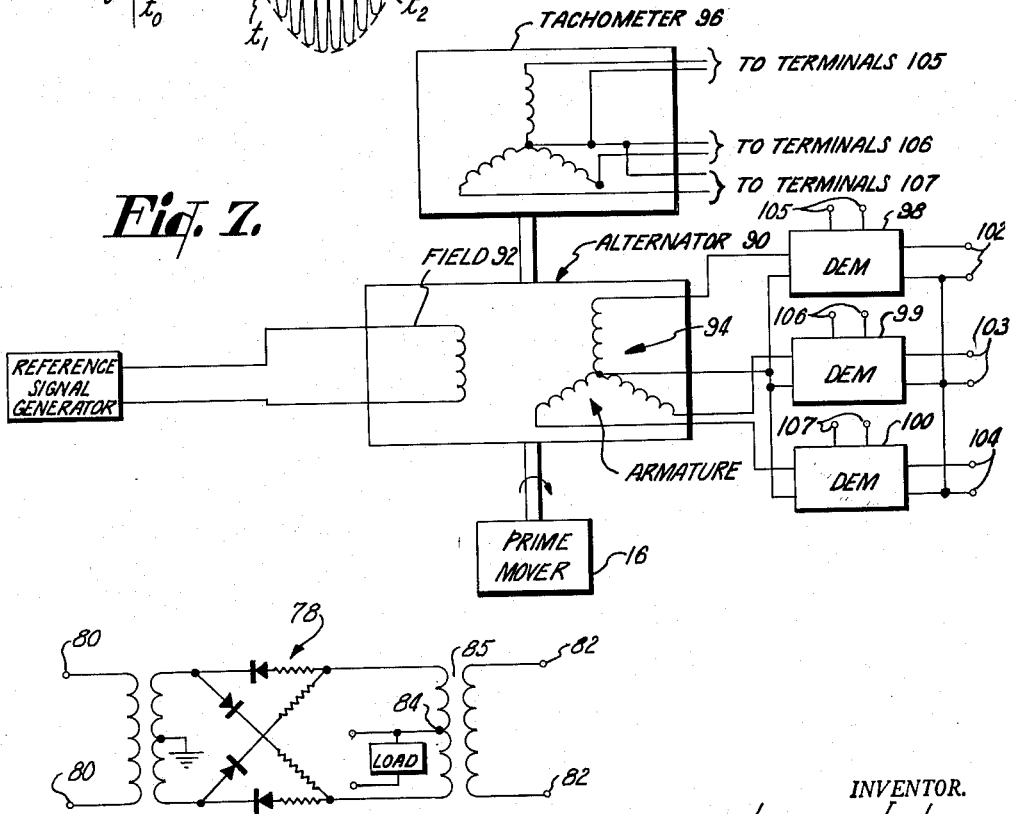

United States Patent Office 3,001,124
Patented Sept. 19, 1961

3,001,124
APPARATUS FOR PRODUCING ALTERNATING CURRENT
Leopold J. Johnson, Anaheim, Calif., assignor to The Siegler Corporation, Anaheim, Calif., a corporation of Delaware
Filed Jan. 5, 1959, Ser. No. 785,041
11 Claims. (Cl. 322—61)

The present invention relates to apparatus for producing alternating current and more particularly to an apparatus employing a dynamo-electric generator for producing an alternating current having a controlled frequency.

Generally dynamo-electric generators are employed for producing alternating current where a substantial amount of power is required. In many instances it is desirable to use a high speed turbine, i.e., steam or gas turbine, as a prime mover for driving the generator due to the low operating cost or small size of such turbines. It has been necessary in the past to provide some type of speed reducing coupling between the turbine and the generator where an alternating current of relatively low frequency, e.g., 60 cycles, is desired. For example, where the shaft speed of a turbine is of the order of 10,000 r.p.m. it is necessary to provide a speed reducing coupling such as a gear train which provides a reduction ratio of the order of 3 to 1 to drive a two-pole alternator and produce a 60-cycle output signal. Such couplings are very expensive. Furthermore, to accurately control the output frequency of the alternator, it has been necessary in the past to control the shaft speed of the alternator since the shaft speed of the turbine will vary to some extent. Arrangements for controlling the speed of rotation of alternators are complex, cumbersome, slow acting and expensive.

The above difficulties are overcome by the present invention by controlling the magnetic field for the armature of a generator in accordance with an alternating current reference signal. The apparatus of this invention includes a generator having an armature and at least one field winding for producing a magnetic field for the armature, means for driving the generator and means for applying an alternating current reference signal to the field winding for controlling the amplitude and direction of the magnetic field in accordance with the reference signal to cause the armature to produce an alternating current output in the form of a modulated wave, the frequency of the modulated wave being proportional to the speed of the driving means, and the frequency of the modulating wave being equal to the frequency of the reference signal. The apparatus of this invention further includes means coupled to the armature for demodulating the armature output to provide an alternating current output signal having a frequency equal to the reference signal. Thus the present invention provides a novel apparatus for producing alternating current in substantial amounts and having a controlled frequency.

The invention will be explained in more detail in reference to the accompanying drawings in which:

FIG. 4 is a schematic circuit diagram, partially in block form, illustrating another embodiment of this invention;

FIG. 5 is a schematic circuit diagram, partially in block form, illustrating a further embodiment of this invention;

FIG. 6 is a graph similar to the graph of FIG. 3 illustrating waveforms taken at various points in the circuit of FIG. 5;

FIG. 7 is a schematic circuit diagram, partially in block form, illustrating another embodiment of this invention;

FIG. 8 is a simplified illustration of a field winding arrangement for a generator that may be employed in the apparatus of this invention; and FIG. 9 is a schematic circuit diagram of a diode demodulator that may be employed in the apparatus of this invention.

Figure 1:
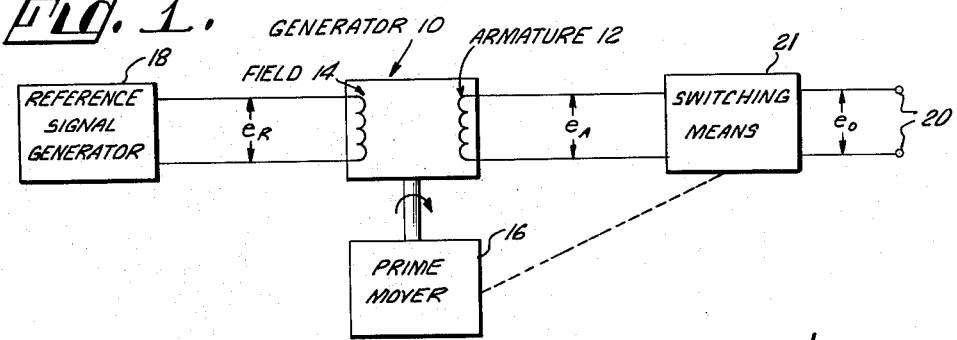
FIG. 1 is a block diagram of one embodiment of the present invention.

Referring now to the drawings and more particularly to FIG. 1 thereof, a generator 10 includes an armature 12 for producing an alternating current and a field winding 14 for producing a magnetic field for the armature 12. A prime mover 16 is coupled to the generator 10 for driving the generator at any desired speed. For example, the prime mover 16 may be a gas turbine having a shaft revolution of the order of 10,000 r.p.m. The reference signal generator 18 is coupled to the field winding 14 to apply an alternating current of a predetermined frequency, i.e., 60 c.p.s. thereto to control the magnitude and direction of the magnetic field in accordance with the reference signal. By providing an alternating magnetic field for the armature the armature produces an output in the form of a modulated wave that changes phase when the reference signal changes polarity. The frequency of the modulated wave is proportional to the speed of rotation of the armature or driving means and the frequency of the modulating wave is equal to the frequency of the reference signal as will be more fully described. A pair of output terminals 20 is provided for deriving an alternating current output from the generator 10. A switching means 21 under the control of the prime mover 16 is coupled between the armature 12 and the output terminals 20 for alternately switching the armature output across the output terminals 20 at a rate proportional to speed of rotation of the armature to demodulate the armature output and produce an alternating current output signal having a frequency equal to the frequency of the reference signal across the output terminals 20.

Figure 2:
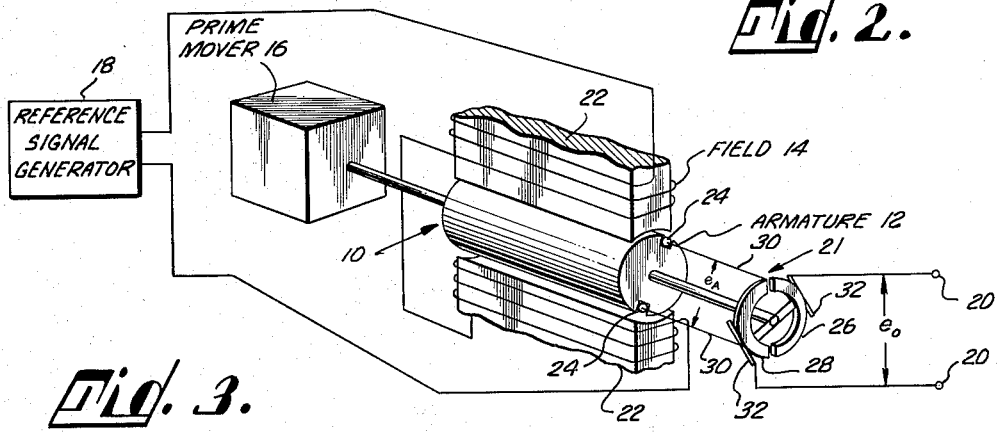
FIG. 2 is a perspective view of a simple type of generator and switching means that may be employed in the apparatus of FIG. 1.

Referring now to FIG. 2, a simplified generator is illustrated as including a pair of oppositely disposed poles 22 on which is wound the field winding 14 to produce a magnetic field for the armature 12. The armature in this simplified illustration is disclosed as including only one coil 24 which is rotated within the magnetic field produced by the field winding 14 and the poles 22. The switching means 21 in FIG. 2 includes two commutating segments 26 and 28 which are connected to opposite ends of the armature coil 24 by leads 30. A pair of brushes 32 is coupled between the output terminals 20 and the commutating segments 26 and 28. In operation the reference signal generator 18 applies an alternating current signal such as the sinusoidal signal $e_R$ (shown in FIG. 3) to the field winding 14 to cause the field winding 14 and the poles 22 to produce a sinusoidal magnetic field for the armature 12. This causes the armature 12 to produce an output wave $e_A$ (shown in FIG. 3) which varies in amplitude and phase in accordance with the reference signal $e_R$. The waveform $e_A$ is a combination of two waves, that is, a modulated wave 40 and a modulating wave 42. The modulated wave 40 has a frequency proportional to the speed of rotation of the armature and the number of poles in the generator.

Figure 3:
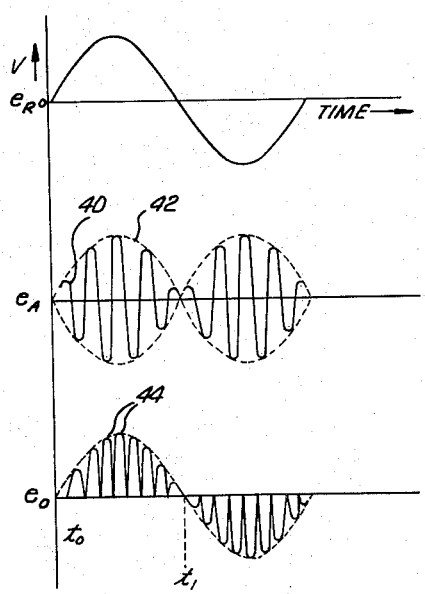
FIG. 3 is a graph illustrating waveforms taken at various points in the apparatus of FIGS. 1 and 2 wherein the ordinate represents voltage and the abscissa represents time.

This modulated wave which may be compared to a high frequency carrier signal results from the relative rotation of the armature 12 with respect to the poles 22. This modulated wave 40 changes polarity during each revolution of the armature 12, as shown. The amplitude of this modulated wave 40 is controlled by the field strength which is in turn controlled by the amplitude of the signal applied to the field winding 14. When the reference signal $e_R$ changes polarity with respect to the field winding 14 at times $t_1$, as shown in FIG. 3, the phase of the armature output $e_A$ also changes. Thus the armature output is similar to a modulated double side band suppressed carrier wave.

The switching means 21 demodulates the armature output $e_A$ by alternately reversing the connection between the armature and the output terminals 20. As shown in FIG. 2, this connection is reversed once during each revolution of the armature 12. This action is identical to the commutator action of a D.C. generator having only one coil in the armature. The polarity of the output signal $e_O$ changes at time $t_1$ or when the phase of the armature output changes. Thus the output $e_O$ is a sinusoidal wave having a frequency equal to the frequency of the reference signal. The modulated wave 40 must of course have a relatively high frequency with respect to the modulating or reference signal to provide a sinusoidal output across the terminals 20.

As is shown in FIG. 3, the output voltage $e_O$ contains a high frequency ripple component 44 which may be removed by a suitable filter if desired. This ripple component in the output due to the high frequency wave 40 may be substantially omitted by employing many coils in the armature 12 and connecting the coils in the armature output so that the resultant current is the sum of the voltages generated in several individual coils. While the switching means illustrated in FIG. 2 includes a commutator having two segments, the number of segments will of course depend upon the number of poles employed in the generator. Where four poles are employed a four-segment commutator is necessary, etc.

Referring now to FIG. 4, there is shown another embodiment of the invention in which a direct current (D.C.) generator 50 is utilized. The generator 50 includes a field winding 52 which is connected to the reference signal generator 18, an armature (not shown) having a multiple coil winding, the ends of which are connected to a multiple segment commutator 53, and a pair of brushes 54 coupled between the commutator and the output terminals 20. As is well known, the alternating current produced in the armature of a D.C. generator when a direct current is applied to the field winding thereof is rectified by the commutator and brush arrangement to produce a direct current output signal. In the present invention an alternating current signal is applied to the field winding of the D.C. generator 50 to cause the armature to produce a modulated wave similar to that disclosed by the curve $e_A$ in FIG. 3. This modulated wave or armature output is demodulated by the commutator to produce an alternating current output signal across the output terminals 20 having a frequency equal to the frequency of the reference signal. The output signal from the D.C. generator contains substantially no ripple component.

In FIG. 5 a further embodiment of the present invention is shown wherein a single phase alternator 60 is coupled to a prime mover 16 to be driven thereby and includes a field winding 14 and an armature 12. A reference signal generator 18 is coupled to the field winding 14 to cause the armature 12 to produce a modulated output wave $e_A$ (as shown in FIG. 6) in a manner similar to that described with respect to the apparatus of FIG. 2. A full wave phase sensitive transistor demodulator 62 is coupled between the output terminals 20 and the armature 12 to demodulate the armature output, as will be more fully described. The demodulator includes a pair of power input terminals 63 which are connected to the armature 12 and six control input terminals 64 which are connected to a tachometer 65. The tachometer 65 is coupled to the shaft of the prime mover 16 for sensing the speed of rotation of the armature 12 and to provide four separate control signals $e_C$, each having a frequency which is equal to the frequency of the modulated signal 40. The armature output is directly connected to the collector electrodes of semiconductor devices or transistors 66–69. One of the output terminals 20 is connected to the emitter electrodes of the transistors 66 and 68 and the other output terminal 20 is connected to the emitter electrodes of the transistors 67 and 69, as shown. The tachometer 65 includes four separate windings 65A, 65B, 65C, 65D, which are wound as shown by the conventional polarity markings. The windings 65A, 65B, 65C and 65D are connected between the emitter and base electrodes of the transistors 66, 67, 68 and 69 respectively. Current limiting resistors 70–73 are connected in series with the base electrodes of the respective transistors to limit the current therethrough.

As shown in FIG. 5, the windings 65A through 65D are connected to the base and emitter electrodes of the transistors 66–69 so that only two of the transistors will be rendered conducting at one time. For example, assume that the signals generated in the windings 65A through 65D are positive at the ends thereof indicated by the dots. In this condition a positive signal is applied between the emitter and base electrodes of the transistors 66 and 69 which renders these transistors conducting. At this same time a negative signal is applied between the emitter and base electrodes of the transistors 67 and 68 which maintains these transistors in a nonconducting state. When a negative control signal is generated in the tachometer windings the transistors 67 and 68 are rendered conducting and the transistors 66 and 69 are rendered nonconducting. To provide full wave operation of the demodulator 62, windings 65A through 65D of the tachometer 65 are arranged to provide a control signal having a voltage amplitude larger than the maximum amplitude of the voltage developed in the armature 12. Thus current may flow in either direction through the transistors 66–69, that is, from the emitter to the collector or from the collector to the emitter electrodes. When a positive signal is generated in the armature 12 and in the tachometer windings to render the transistors 66 and 69 conducting, a positive signal is applied across the output terminals 20 and across a load 74 connected thereto. Also when a negative signal is generated in the armature 12 and in the tachometer windings to render the transistors 67 and 68 conducting a positive signal is applied across the output terminals. This occurs when the modulated signal 40 is in phase with the control signal $e_C$, as may be seen in FIG. 6. When the modulated signal 40 and the control signal $e_C$ are out of phase or from time $t_1$ to $t_2$ the transistors 67 and 68 are rendered conducting when a positive voltage is generated in the armature 12 and the transistors 66 and 69 are rendered conducting when a negative voltage is generated in the armature 12, thereby producing a negative voltage across the output terminals 20, as shown by the curve $e_O$ in FIG. 6. While the voltage produced by the windings of the tachometer 65 must be greater than the voltages generated in the armature 12 to provide full wave operation, little power need be supplied by the tachometer windings 65A through 65D since these windings are controlling the base emitter electrodes of the transistors 66 through 69. Many other types of demodulators may be employed in the circuit of FIG. 5 instead of the transistor demodulator 62 for demodulating the armature output to provide an alternating current signal across the output terminals 20 which has a frequency equal to the frequency of the reference signal. For example, a conventional diode demodulator circuit 78, as shown in FIG. 9, may be employed for this purpose. It is only necessary to connect the armature 12 to power input terminals 80 and the tachometer 65 to the control input terminals 82. The output terminals 20 may be connected to the center tap 84 of the transformer 85 and to ground.

Another embodiment of the present invention is disclosed in FIG. 7 wherein a three-phase alternator 90 is coupled to the prime mover 16 and includes a field winding 92 and a three-phase armature 94. A tachometer 96 having a three-phase winding is connected to the shaft of the prime mover 16 to provide a three-phase control signal. Three separate demodulators 98, 99 and 100 are coupled to the individual phases of the armature 94 for demodulating the armature output to provide alternating current output signals across output terminals 102, 103 and 104. The demodulators 98, 99 and 100 include control input terminals 105, 106 and 107 respectively, which are coupled to respective windings of the tachometer 96, as shown, so that the control signals applied to any demodulator are in phase with the armature output coupled to the demodulator. The demodulators 98-100 may be of any conventional type such as the demodulator 62 shown in FIG. 5 or the demodulator 78 shown in FIG. 7. Of course if the demodulator 62 is employed additional windings will be required as illustrated in FIG. 5. The output signals from the demodulators 98-100 may be connected to separate loads or may be connected to a common load by connecting the outputs in parallel. Where the demodulators are connected to a common load the ripple component in the output is materially reduced due to the ripple voltage components in each of the demodulators being 120° out of phase with the ripple voltage components in the outputs of the other demodulators.

A three-phase output signal may be obtained by employing a three-phase alternator having three separate magnetic circuits for the respective phases of the alternator and providing a separate field winding for each of the three phases. To control the magnetic fields produced by the field windings, a three-phase reference signal may be employed with the individual phases of the reference signal being coupled to respective field windings.

The generator employed in the apparatus of this invention may be either a rotating or a stationary armature type and it may have any desired number of poles. FIG. 8 is a simplified illustration of the field windings of a six-pole machine. As shown, the adjacent poles are connected in series across the output of the reference signal generator 18. Thus the magnetic field produced by any two adjacent poles is controlled in amplitude and direction in accordance with the signal produced by the generator 18.

From the various embodiments of the invention which have been illustrated, it will be apparent that many types of circuits may be employed in carrying out the present invention. Various types of demodulating means such as the commutator arrangement disclosed in FIGS. 2 and 4 may be employed for demodulating the armature output of a generator and where an electronic demodulator is employed such as the transistor demodulator 62 shown in FIG. 5 or the diode demodulator disclosed in FIG. 9, various types of control signal generators may be employed for generating a control signal having the frequency of the modulated signal produced in the armature output. Also various types of reference signal generators may be employed to generate an alternating current modulating signal. It is of course not necessary that this modulating signal be a sinusoidal wave; it may be a square wave or any other type of alternating current wave depending upon the desired output signal waveform.

What is claimed is:
1. Apparatus for producing alternating current comprising a generator having an armature for producing an alternating current output and at least one field winding for producing a magnetic field for the armature, means for driving the generator, means for applying an alternating current signal having a predetermined frequency to the field winding to cause the armature to produce an alternating current output having a wave form which is a combination of a first component frequency equal to the predetermined frequency and a second component frequency proportional to the speed of the driving means, a pair of output terminals and electronic switching means coupled between the armature and the output terminals and under the control of the driving means for alternately switching the output from the armature to produce an alternating current output signal across the output terminals which changes in polarity at twice the first component frequency.

2. Apparatus for producing alternating current comprising an alternator having an armature and at least one field winding for producing a magnetic field for the armature, means for driving the alternator, means for applying an alternating current reference signal to the field winding to cause the armature to produce an alternating current output in the form of a modulated wave wherein the frequency of the modulated wave is proportional to the speed of the driving means and the frequency of the modulating wave is equal to the frequency of the reference signal, a pair of output terminals, a demodulator connected between the armature and the output terminals, means coupled to the alternator for generating an alternating current control signal having a frequency equal to the frequency of the modulated wave and means for coupling said last named means to the demodulator.

3. An apparatus as defined in claim 2 wherein the demodulator is a phase sensitive full wave transistor demodulator and wherein the means for generating the control signal is a tachometer.

4. Apparatus for producing alternating current having a predetermined frequency comprising an alternator having an armature for producing an alternating current output and having a plurality of field windings for producing a magnetic field for the armature, the field windings providing a plurality of magnetic poles disposed around the direction of rotation of the armature, means for producing relative rotary motion between the field windings and the armature, means for applying an alternating current signal having the predetermined frequency to the field windings to control the magnitude and direction of a magnetic field produced by adjacent poles and thereby control the amplitude and phase of the armature output in accordance with the signal applied to the field windings to provide an armature output in the form of a modulated wave which changes phase during each half cycle of the modulating wave, wherein the frequency of the modulated wave is proportional to the speed of rotation of the armature and the frequency of the modulating wave is equal to the predetermined frequency, a pair of output terminals, electronic demodulating means coupled between the armature and the output terminals and electrical signal generating means coupled to the demodulating means and responsive to the speed of rotation of the armature for controlling the operation of the demodulating means.

5. An apparatus as defined in claim 4 wherein the armature includes a three-phase winding and the demodulating means for demodulating the armature output includes a demodulator individually coupled to each of the phases of the armature.

6. An apparatus as defined in claim 5 wherein the electrical signal generating means is a tachometer having three windings, one winding of the tachometer being coupled to each of the demodulators connected to the armature.

7. Apparatus for producing alternating current comprising a generator having an armature and at least one field winding for producing a magnetic field for the armature, means for driving the generator to produce rotary motion between the field windings and the armature, means for applying an alternating current reference signal to the field winding to cause the armature to produce an alternating current output in the form of a modulated wave wherein the frequency of the modulated wave is proportional to the speed of the driving means and the frequency of the modulating wave is equal to the frequency of the reference signal, electronic phase-sensitive demodulator means having power input terminals, control input terminals and output terminals for supplying power to a load, means for connecting the power input terminals to the armature, electrical signal generating means coupled to the generator for producing an electrical signal having a frequency equal to the frequency of the reference signal and means for connecting the electrical signal generator to the control input terminals of the demodulator means for controlling the operation of the demodulator means to produce a signal across the output terminals having a frequency equal to the frequency of the reference signal.

8. An apparatus as defined in claim 7 wherein the demodulator means includes a plurality of semi-conductor devices connected in series between the input and output terminals of the demodulator means.

9. An apparatus as defined in claim 7 wherein the electrical signal generator is a tachometer coupled to the driving means.

10. An apparatus as defined in claim 9 wherein the armature includes a polyphase winding, wherein the demodulator means includes a separate single phase demodulator connected between each phase of the armature and the output terminals and wherein the tachometer includes a polyphase winding.

11. An apparatus for producing alternating current having a controlled frequency comprising an alternator having a three phase armature for producing an alternating current output and at least one field winding for producing a magnetic field for the armature, means for driving the alternator to produce rotary motion between the armature and the field winding, means for applying an alternating current reference signal to the field winding to cause the armature to produce an alternating current output in the form of a suppressed carrier modulated wave having a first component frequency equal to the frequency of the reference signal and a second component frequency proportional to the speed of the driving means, tachometer means coupled to the driving means and having at least one three-phase winding for producing signals that have a frequency equal to the second component frequency, an electronic phase-sensitive demodulator coupled individually to one winding of the armature and one winding of the tachometer for demodulating the armature output to produce an output signal having a frequency equal to the reference signal, and means for connecting the outputs of the demodulators to provide a three phase output signal.

References Cited in the file of this patent
UNITED STATES PATENTS

| | | |
|---|---|---|
| 783,708 | Stanley | Feb. 28, 1905 |
| 2,528,111 | Buckthal | Oct. 31, 1950 |
| 2,695,371 | Barnes | Nov. 23, 1954 |
| 2,854,617 | Johnson | Sept. 30, 1958 |